(12) United States Patent
Haser et al.

(10) Patent No.: US 7,930,151 B2
(45) Date of Patent: Apr. 19, 2011

(54) METHOD FOR CALCULATING AN INDIVIDUAL PROGRESSIVE LENS

(75) Inventors: Stephan Haser, Munich (DE); Andrea Welk, Munich (DE); Gregor Esser, Munich (DE); Helmut Altheimer, Baisweil-Lauchdorf (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 795 days.

(21) Appl. No.: 10/551,127

(22) PCT Filed: Dec. 19, 2003

(86) PCT No.: PCT/EP03/14620
§ 371 (c)(1),
(2), (4) Date: Nov. 8, 2006

(87) PCT Pub. No.: WO2004/086125
PCT Pub. Date: Oct. 7, 2004

(65) Prior Publication Data
US 2007/0132945 A1    Jun. 14, 2007

(30) Foreign Application Priority Data
Mar. 24, 2003    (DE) .................................. 103 13 275

(51) Int. Cl.
*G06F 7/60*    (2006.01)
*G02C 7/02*    (2006.01)

(52) U.S. Cl. .................. 703/2; 703/1; 351/41; 351/148; 351/159; 351/169; 351/176

(58) Field of Classification Search .................. 703/1, 2; 351/161, 164, 176, 41, 148, 159, 169
See application file for complete search history.

(56) References Cited

U.S. PATENT DOCUMENTS

| | | | | |
|---|---|---|---|---|
| 4,787,733 A | * | 11/1988 | Silva | 351/177 |
| 5,479,220 A | * | 12/1995 | Komatsu et al. | 351/159 |
| 5,517,260 A | * | 5/1996 | Glady et al. | 351/169 |
| 5,767,939 A | * | 6/1998 | Komatsu et al. | 351/159 |
| 5,805,265 A | * | 9/1998 | Umeda | 351/169 |
| 5,861,935 A | * | 1/1999 | Morris et al. | 351/169 |
| 6,199,983 B1 | * | 3/2001 | Kato et al. | 351/169 |
| 6,637,880 B1 | * | 10/2003 | Yamakaji et al. | 351/177 |

(Continued)

FOREIGN PATENT DOCUMENTS

DE    4210008    9/1993

(Continued)

OTHER PUBLICATIONS

"Conception and Development of Progressive Lenses", Dipl.-Phys. Werner Koppen, WVAO, 1995, pp. 92-97 and English Translation Thereof.

*Primary Examiner* — Kamini S Shah
*Assistant Examiner* — Kibrom Gebresilassie
(74) *Attorney, Agent, or Firm* — Crowell & Moring LLP (57) ABSTRACT

A method of calculating an individual progressive lens creates one or more basic designs for lenses based on theoretical specifications, and then creates starting designs from these basic designs. Individual progressive lenses are calculated from the starting designs corresponding to the individual data from wearing test subjects. Valid starting designs are then created for production. The individual lenses are calculated from the starting designs according to individual customer data.

3 Claims, 5 Drawing Sheets

U.S. PATENT DOCUMENTS

| | | | |
|---|---|---|---|
| 6,712,467 B1* | 3/2004 | Kitani | 351/169 |
| 6,827,443 B2* | 12/2004 | Fisher et al. | 351/209 |
| 2003/0048410 A1* | 3/2003 | Baumbach et al. | 351/178 |
| 2003/0107705 A1* | 6/2003 | Zimmermann et al. | 351/169 |
| 2003/0107707 A1* | 6/2003 | Fisher et al. | 351/177 |
| 2003/0123026 A1* | 7/2003 | Abitbol et al. | 351/204 |
| 2004/0085650 A1* | 5/2004 | Fendt et al. | 359/744 |
| 2004/0114104 A1* | 6/2004 | Welk et al. | 351/168 |
| 2004/0215525 A1* | 10/2004 | Keane et al. | 705/26 |
| 2005/0122472 A1* | 6/2005 | Fisher et al. | 351/177 |
| 2007/0008488 A1* | 1/2007 | Esser et al. | 351/159 |
| 2010/0296055 A1* | 11/2010 | Esser et al. | 351/204 |

FOREIGN PATENT DOCUMENTS

| | | |
|---|---|---|
| DE | 19917314 | 10/1999 |
| EP | 0880046 | 11/1998 |
| WO | WO01/81979 | 11/2001 |

* cited by examiner

METHOD FOR CALCULATING AN INDIVIDUAL PROGRESSIVE LENS

BACKGROUND OF THE INVENTION

The invention relates to a method for calculating an individual progressive lens.

Progressive lenses (also referred to as no-line bifocals, multifocal lenses, etc.) are usually understood to refer to lenses which have a different (lower) refractive power in the area through which the lens wearer observes an object at a greater distance-hereinafter referred to as the far part-than in the area (near part) through which the user observes a near object. The so-called progression zone is between the far part and the near part is where the effect of the lens increases continuously from that of the far part to that of the near part. The value of the increase in effect is also referred to as addition.

As a rule, the far part is located in the upper part of the lens and is designed for looking "into an infinite distance" while the near part is located in the lower area of the lens and is designed for reading in particular. For special applications, e.g., pilot's glasses or glasses for working at a computer monitor may be cited as examples here the far part and the near part may also be arranged differently and/or designed for different distances.

Furthermore, it is possible for a lens to have multiple near parts and/or multiple far parts and corresponding progression zones accordingly.

In progressive lenses having a constant refractive index an increase in refractive power between the far part and the near part requires that the curvature of one or both surfaces must change continuously from the far part to the near part.

The surfaces of lenses are usually characterized by the so-called principal radii of curvature $R1$, $R2$ at each point on the surface (sometimes instead of the principal radii of curvature, the so-called principal curvatures $K1=1/R1$ and $K2=1/R2$ are also given). The principal radii of curvature together with the refractive index n of the lens material determine the values often used to characterize a surface optometrically:

Surface refractive value $D=0.5*(n-1)*(1/R1+1/R2)$.

Surface astigmatism $A=(n-1)*(1/R1+1/R2)$.

The surface refractive value D is the value which achieves the increase in effect from the far part to the near part is achieved. The surface astigmatism A (the cylinder effect) is an "interfering property" because, unless the eye itself has an astigmatism to be corrected, an astigmatism exceeding a value of approx. 0.5 dpt leads to an image on the retina which is perceived as blurred.

WO 01/81979 describes a method for calculating a progressive lens by using the properties of refractive value and astigmatism which are determined along a line (principal line) which corresponds to the principal line of sight.

For the calculation of individual lenses, the optimization must be performed within a very short period of time because due to the great variety of possible combinations of effect, they can be calculated only on order.

SUMMARY OF THE INVENTION

An object of this invention is to provide a method with which individual progressive lenses can be calculated and optimized in a very short period of time, whereby optimum properties are obtained along the principal line of sight in progressive lenses, i.e., the principal line and the principal line of sight coincide and all individual parameters are taken into account.

This object has been achieved by a method which includes the following steps:

Creating one or more basic designs of lenses on the basis of theoretical specifications, Creating starting designs from these basic designs, Calculating individual progressive lenses from the starting designs corresponding to individual data on test subjects wearing the lenses, Creating the final starting designs for production, and Calculating the individual lenses from the starting designs according to individual customer data.

First a basic design and/or a number of basic designs are created. These are analyzed on the basis of the theoretical data. The basic designs are then modified and adjusted until they correspond to the specifications (e.g., from basic research or wearing tests). This basic design is calculated for a weak effect and default values or standard values which are described in greater detail below. In principle, such a basic design can be created by a method like that described in aforementioned WO 01/81979.

In the next step so-called starting designs are created from the basic designs. Starting designs are a limited number of progressive lenses which have been calculated for default values for the individual parameters and cover the range of effect. If only a few lenses are made available for the starting design, the complexity is much lower. However, this makes it more difficult to comply with the various requirements of hyperopias, myopias, etc., and the complexity in optimization of the individual progressive lenses becomes even greater. For this reason, if various basic designs (usually three to four) are to be tested in comparison with one another in wearing tests, the starting design will have only a few options but more options will usually be included in the final starting design for production.

In the extreme case this may be a single basic design. However, at least one series will usually be provided for myopia, one series for emmetropia and one series for hyperopia.

An example is given in the following table:

| | Sph/Add [dpt] | | |
|---|---|---|---|
| | −4 | 0 | +4 |
| 1.5 | + | + | + |
| 2.0 | + | + | + |
| 2.5 | + | + | + |

For calculation and optimization of progressive lenses, average individual parameters are taken into account, usually the following values:

Prescribed cylinder=0 dpt; prism vertically and horizontally=0 cm/m;

Definition of the effect in the reference points (use position, vertex measurement, etc.);

Interpupillary distance PD=63 mm; corneal vertex distance=15 mm; ocular pivot point distance=28.5 mm; anterior tilt=8 degrees;

Frame lens angle (lateral tilt)=0 degrees;

Center thickness or edge thickness varies as a function of prescription, addition and diameter;

Diameter=70 mm;

Thickness reduction prism varies as a function of prescription, addition and diameter; material=material with average refractive index;

Far object distance=0 dpt; near object distance=−1000/380 mm or object distance in near vision=−add (for add >2.5 dpt).

The basic curve (shape (usually a sphere) and bending (refractive value) of the second surface) varies as a function of prescription, addition and diameter.

From these starting designs, the progressive lenses corresponding to the individual data on the test wearing subjects are calculated. The calculation method is described in greater detail below.

As an alternative, all lenses for wearing experiments may also be calculated by the method described in aforementioned WO 01/81979.

In a second design loop, the design can be modified and adjusted on the basis of the wearing tests. In a first phase, the various starting designs are tested in an internal wearing test with a smaller number of volunteers. In a second phase, external wearing tests are conducted with a relatively large number of volunteers. This yields three design loops in principle.

When the final design has been found, the starting design for production must be created. This is normally selected to have more options than the starting design for the wearing test.

The following table gives an example where starting designs have been created for all the effects presented here:

|     | Sph/Add [dpt] | | | | | |
| --- | --- | --- | --- | --- | --- | --- |
|     | −10 | −5 | −1 | +2 | +5 | +8 |
| 1.0 | + | + | + | + | + | + |
| 1.5 | + | + | + | + | + | + |
| 2.0 | + | + | + | + | + | + |
| 2.5 | + | + | + | + | + | + |
| 3.0 | + | + | + | + | + | + |

Figure 5:
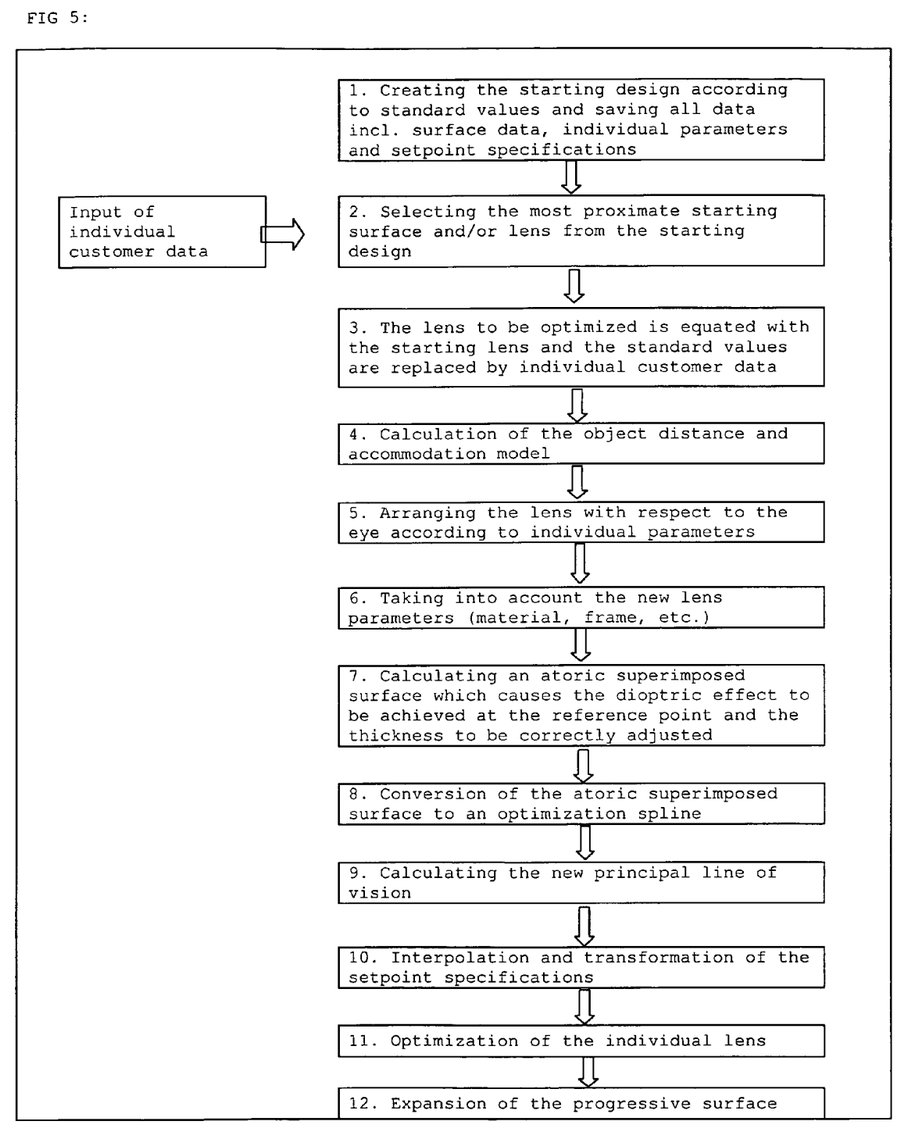
FIG. 5 is a flow chart of the inventive online optimization and computation method.

The calculation method is explained in greater detail below with reference to FIG. 5.

First, all the parameters of the lens from the starting design must be saved. In addition to the individual parameters already mentioned, the starting design also includes the following: surface data on the progressive surface; coordinates of the reference points; object distance model as a function of the view-through points; accommodation model as a function of the object distance; course of the principal line (described in aforementioned WO 01/81979) and all setpoint specifications at all evaluation points (view-through points).

The progressive surface is best described by B splines. The order of the splines and the number of the coefficients are free parameters. The higher the order of the splines, the finer can be the description of an interval but the greater the tendency of the splines to vibration. For this reason, fourth-order splines or cubic splines in particular are preferred. Also, through the number of coefficients the variability with which a surface can be described can be controlled.

However, the complexity of the optimization problem increases with the number of coefficients, and therefore the computation time also increases. Nevertheless, a large number of coefficients (approximately 4,000) have proven successful. A progressive lens is usually optimized by minimizing a target function. The target function may be written as follows, for example:

$$\min \Sigma g a_i (A_{actual} - A_{setpoint})_i^2 + g b_i (B_{actual} - B_{setpoint})_i^2$$

where A, B, etc., denote the properties to be optimized such as astigmatism, refractive value, binocular imbalances, gradients of astigmatism and refractive value, distortion, etc. However, it is unfavorable if too many properties are written into the target function because a progressive lens is described on the basis of a second order strip and a specification function over the entire lens. For this reason, too many properties make the optimization difficult due to possible contradictory requirements in the target function. Therefore, two properties in the target function are sufficient. Other properties may be monitored and adjusted later in the design loop based on the analysis.

In addition, each property can be weighted as a function of location over the weighting site i. It is thus possible to weight one property with respect to the other property but also to weight a property as a function of location, e.g., an astigmatism is weighted more at a distance than in near vision.

The more evaluation points one has, the longer the optimization takes because the corresponding properties must be calculated based on rays—and complete calculation of the local wave front—at each evaluation point. However, it is clear that when there are multiple evaluation points, the lens and/or optimization of the lens can be controlled much better and more accurately. Therefore, the use of multiple evaluation points is preferred; as a rule, approximately 15,000 evaluation points will be used.

In addition, it is advantageous if both the coefficients and the evaluation points are not equally distributed at equidistant points over the lens but instead the number of evaluation points and/or coefficients is to be increased in areas where there are greater changes in properties or in areas which are regarded as being more important.

It is important for the setpoint specifications not to be stipulated as absolute values but instead as deviations or allowed errors. An example is given below.

A progressive lens having the values sph 0.5 cyl 1.0 A 0 deg add 2.0 is to be optimized. If absolute values are to be specified, the following would be required at the far reference point, for example: ideally sph 0.5 cyl 1.0 A 0 deg, and at the near reference point: sph 2.5 cyl 1.0 A 0 deg because the lens should correspond exactly to the requirements here. However, sph 1.5 cyl 2.0 A 45 deg would ideally be required in the periphery. From these starting designs, the progressive lenses corresponding to the individual data on the test wearing subjects are calculated. The calculation method is described in greater detail below.

As an alternative, all lenses for wearing experiments may also be calculated by the method described in aforementioned WO 01/81979.

In a second design loop, the design can be modified and adjusted on the basis of the wearing tests. In a first phase, the various starting designs are tested in an internal wearing test with a smaller number of volunteers. In a second phase, external wearing tests are conducted with a relatively large number of volunteers. This yields three design loops in principle.

When the final design has been found, the starting design for production must be created. This is normally selected to have more options than the starting design for the wearing test.

The setpoint specifications must always be very close to the target and there are necessarily greater imaging errors in the periphery. This shows clearly how important suitable setpoint specifications are for calculation and optimization of a progressive lens.

When absolute values are specified, separate setpoint specifications must be supplied for each prescription. This is a disadvantage in optimizing individual progressive lenses in particular.

For this reason, it is better to combine the actual values of a lens with the refraction deficit of the eye and compare them with the setpoint specifications. The combination with the eye is best made using the cross-cylinder method as described in aforementioned WO 01/81979, for example. Then the setpoint specifications in the above example would amount to 0 dpt in the far and near reference points, namely the refraction error$_{ideal}$ and astigmatic deviation$_{ideal}$ and in the periphery (as an example) the refraction error$_{ideal}$ would be 1.0 dpt and the astigmatic deviation$_{ideal}$ would be 1.25 dpt. The axial position would thus be taken into account on the basis of the cross-cylinder method. Thus these setpoint specifications are independent of the prescription. The differences in the setpoint specifications with regard to ametropia, myopia, etc. are obtained via the different setpoint specifications with the different effects of the starting design. The astigmatic deviation and the refraction error have proven to be suitable specifications here.

It is also essential for the evaluation points to be stored not with the Cartesian coordinates x and y but instead with the coordinates u and y, where u is the distance from the evaluation point to the principal line, i.e., $u=x-x_{HL}(y)$. This is important to be able to adapt the setpoint specifications easily to the new principal line of vision in the calculation of the individual lens.

The starting designs for production will be created in the next step.

Then the calculation of the individual lenses is performed according to individual customer data using with the starting design.

The calculation program obtains the new individual parameters using an input mask (in the case of wearing tests) or via an interface in online optimization in the production process. All these parameters have already been identified. The most proximate starting lens with all parameters and setpoint specifications is selected from the starting design on the basis of the prescribed spherical effect and addition. The lens to be optimized is equated with the selected starting lens and then the individual parameters of the starting lens are replaced by the new parameters, in particular by the prescribed spherical, cylindrical and prismatic values, the addition and the thickness reduction prism.

Then the object distance and accommodation model is calculated anew.

Next the lens is arranged in space and/or with respect to the eye according to the new individual parameters (interpupillary distance, corneal vertex distance, ocular pivot point distance, anterior tilt and lateral tilt).

In the next step the material (refractive index), the diameter and/or the frame shape and the basic curve are replaced.

Then an atoric surface is imposed on the progressive surface. The atoric surface is calculated so that at the far reference point the spherical and cylindrical effect including the axial position, preferably in the use position, corresponds to the prescription; the vertical and horizontal prism, preferably in the use position, corresponds to the combination of the prescribed prism and the thickness reduction prism at the prism reference point and the center thickness and/or edge thickness corresponds to the specified value. This is best achieved with an iteration method (e.g., Newtonian iteration with six variables). The six degrees of freedom here are the two principal curvatures and the axial position of the atoric surface, the surface normals (x and y components) at the vertex of the total progressive surface and the distance from the front surface to the back surface.

This yields a progressive lens, the quality of which corresponds to that of a conventional progressive lens except that the progressive and astigmatic effects are on one side.

It is of course also possible to perform the superpositioning on the nonprogressive side and then optimize it. This then yields an individual lens with a progressive surface and an individual atoric surface. In addition, it is also possible to design the basic surface to be atoric, then to apply this primarily to the prescribed astigmatism and additionally superimpose a correction torus on the progressive surface and finally optimize this superimposed surface accordingly. Then an individual lens with an individual progressive surface and a toric surface is obtained. The progressive surface may be either on the front or the back of the lens.

However, it is preferable for the front surface to be spherical or at least rotationally symmetrical and for the back surface to be an individual progressive surface which carries the entire prescription consisting of the spherical prescription and the cylindrical prescription because then the an amorphotic distortion is lowest (see Auge und Brille [Eye and Lens], Bücherei des Augenarztes [Ophthalmologist Book Series], volume 59 by Josef Reiner). This variant is assumed below. However, this method can also be applied to other variants that have already been described.

In the next step, the calculated atoric surface is converted into a B spline, a so-called superimposed spline or optimization spline. It is also possible to calculate a new B spline from the atoric superimposed surface and the progressive surface beneath that. However, it is better to use a superimposed spline.

Then the number of coefficients to be optimized can be selected independently of the basic surface (progressive surface) underneath without losing information and the surface to be optimized must carry less information. However, this is important only for optimization of coefficients. The arrow height of the back surface always corresponds to the sum of the basic surface and the superimposed spline. In the optimization, the complete back surface is always taken into account in the beam calculation as well as in the wave front calculation.

In the next step, the principal line of vision is calculated anew because it deviates from the old principal line and/or principal line of sight because of the altered positioning of the lens in relation to the eye and the altered prismatic effect in the view-through sites.

Then the setpoint specifications are shifted by the amount by which the new principal line of vision has been shifted in comparison with the old principal line of vision in each horizontal step, i.e., each setpoint specification receives a new respective u coordinate. For example if the x offset of the principal line of vision at the height of the near reference point were to be 3 mm instead of 2 mm, then the u coordinates would be shifted by 1 mm in this horizontal section. It is preferable for the setpoint specifications not to be taken from a starting lens but instead to be interpolated according to the effect from the adjacent lenses of the starting design.

In the next step the progressive surface is optimized either with a commercial optimization program (e.g., from the NAG library) or with an optimization program tailored specifically to the problem and the surface representation used. The latter is preferred here. In most cases the goal is reached after only three optimization steps. However, it is better to perform ten optimization steps for the sake of safety. Such an optimization takes less than 30 seconds based on the ideal starting point and the ideal setpoint specifications and the ideally tailored optimizer on a normal PC (e.g., Intel Pentium 4 processor with 1800 MHz).

It is also contemplated to save all surfaces optimized online so as not to have to perform the optimization again when the same individual prescription data occur. The method described here has been found to be so stable, rapid and reliable that a search algorithm would be more complex than simply calculating each prescription anew.

It has been found advantageous to optimize not the entire surface of the lens but instead only a central area (approx. 20-30 mm) and then expand this area using a specially developed extrapolation program. This saves on computation time without any influence on quality.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
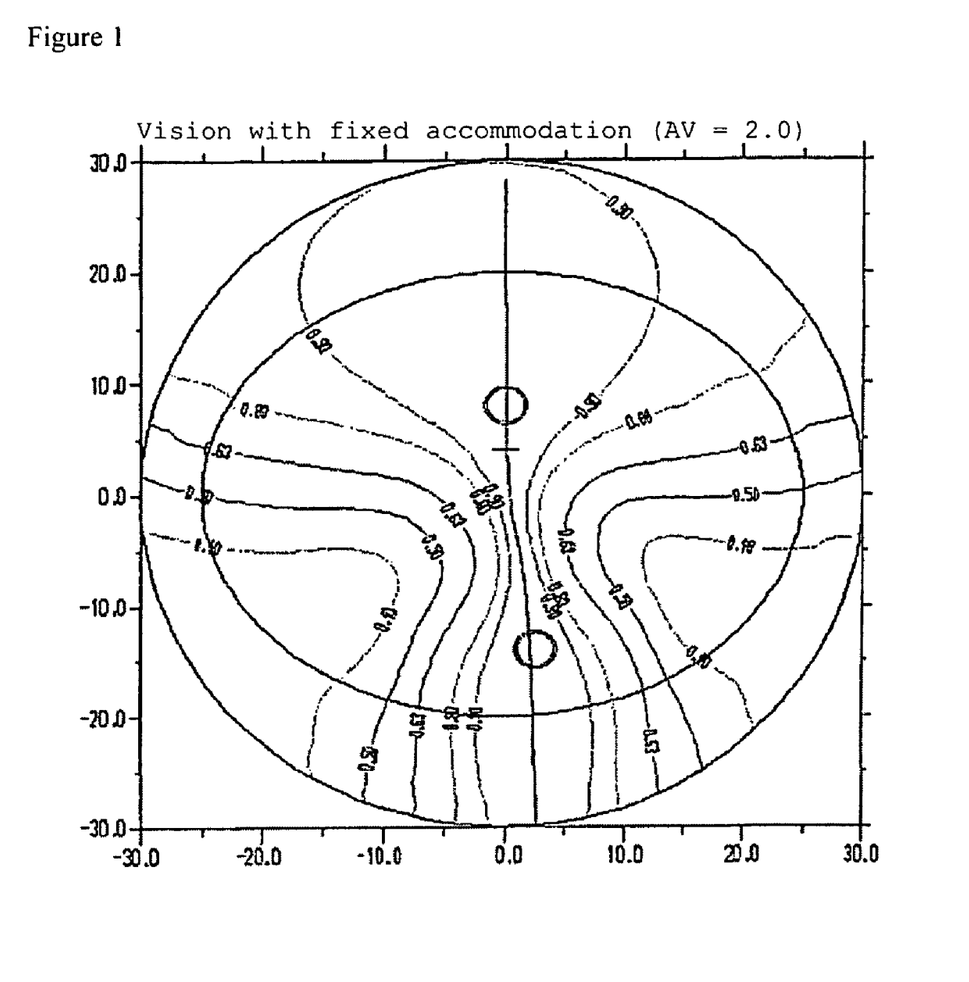
FIG. 1 is a diagram showing the distribution of the decline in visual acuity on the basis of the imaging errors with a progressive lens from the starting design.

The following standard values were used in FIG. 1:

Prescribed sphere=−4.0 dpt; addition 2.0 dpt; prescribed cylinder=0 dpt; prism vertically and horizontally=0 cm/m;

Effect in the reference points in the use position; interpupillary distance=63 mm; corneal vertex distance=15 mm; ocular pivot point distance=28.5 mm; anterior tilt=8 degrees; frame lens angle (lateral tilt)=0 degrees; center thickness=2 mm; diameter=70 mm; thickness reduction prism=1.0 cm/m; material=Perfalit 1.6 n=1.597; far object distance=0 dpt; near object distance=−1000/380 mm; basic curve sph=3.41 dpt. FIG. 1 shows that the isolines are completely symmetrical with the principal line, and also that there is a uniform and soft transition at all points and there are large far and near vision areas. A lens having different individual parameters should also look like this.

Figure 2:
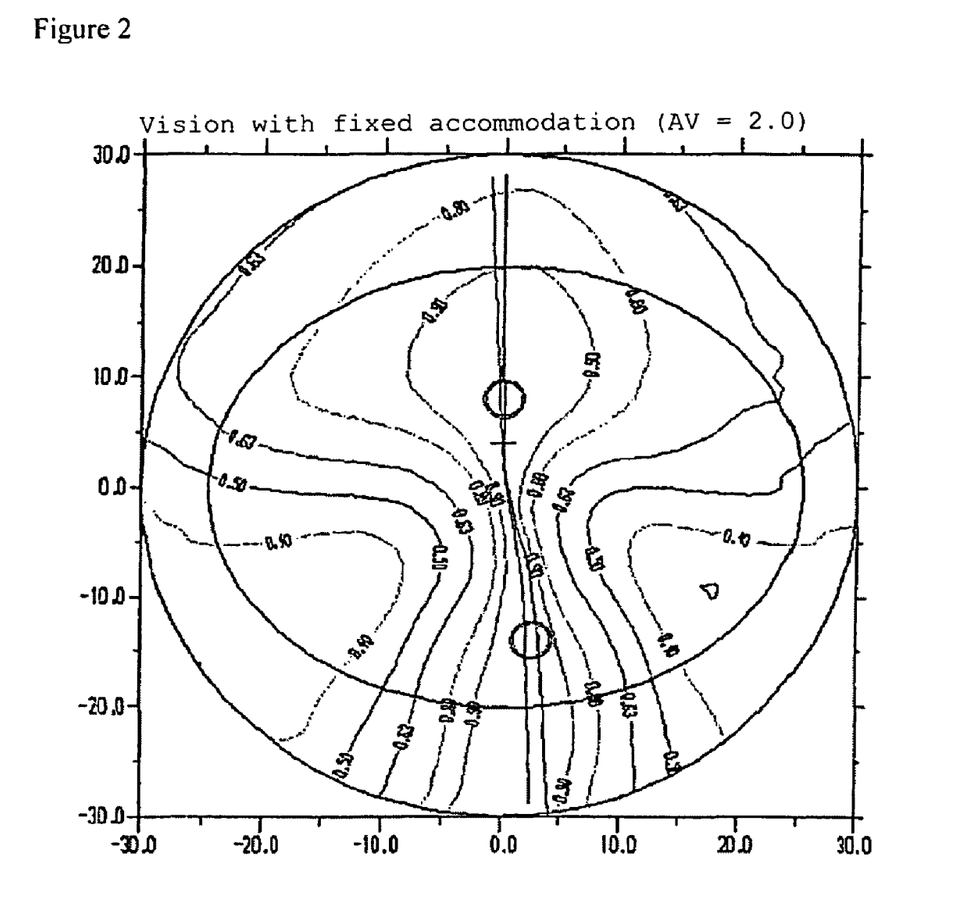
FIG. 2 is a diagram showing the distribution of the decline in visual acuity on the basis of the image errors with a progressive lens after superpositioning with a torus.

The following individual parameters are specified in FIG. 2:

Prescribed sphere=−3.5 dpt; addition=2.0 dpt; prescribed cylinder=1 dpt; axial position=20 deg; prism vertically=−0.5 cm/m; prism horizontally=1.0 cm/m; effect at the reference points in the use position; interpupillary distance=72 mm; corneal vertex distance=19 mm; ocular pivot point distance=32.5 mm; anterior tilt=11 degrees; frame lens angle (lateral tilt)=1 degree; center thickness=2 mm; diameter=70 mm; thickness reduction prism=1.0 cm/m; material=Perfalit 1.6 n=1.597; far object distance=0 dpt; near object distance=!1000/380 mm; basic curve sph=3.7 dpt.

As FIG. 2 shows, the isoline [sic; isolines] are no longer symmetrical with the principal line, the transitions are no longer soft and the vision areas are greatly restricted. Furthermore, it can be seen that there is a shift in the principal line of vision in comparison with the old principal line and/or principal line of vision.

Figure 3:
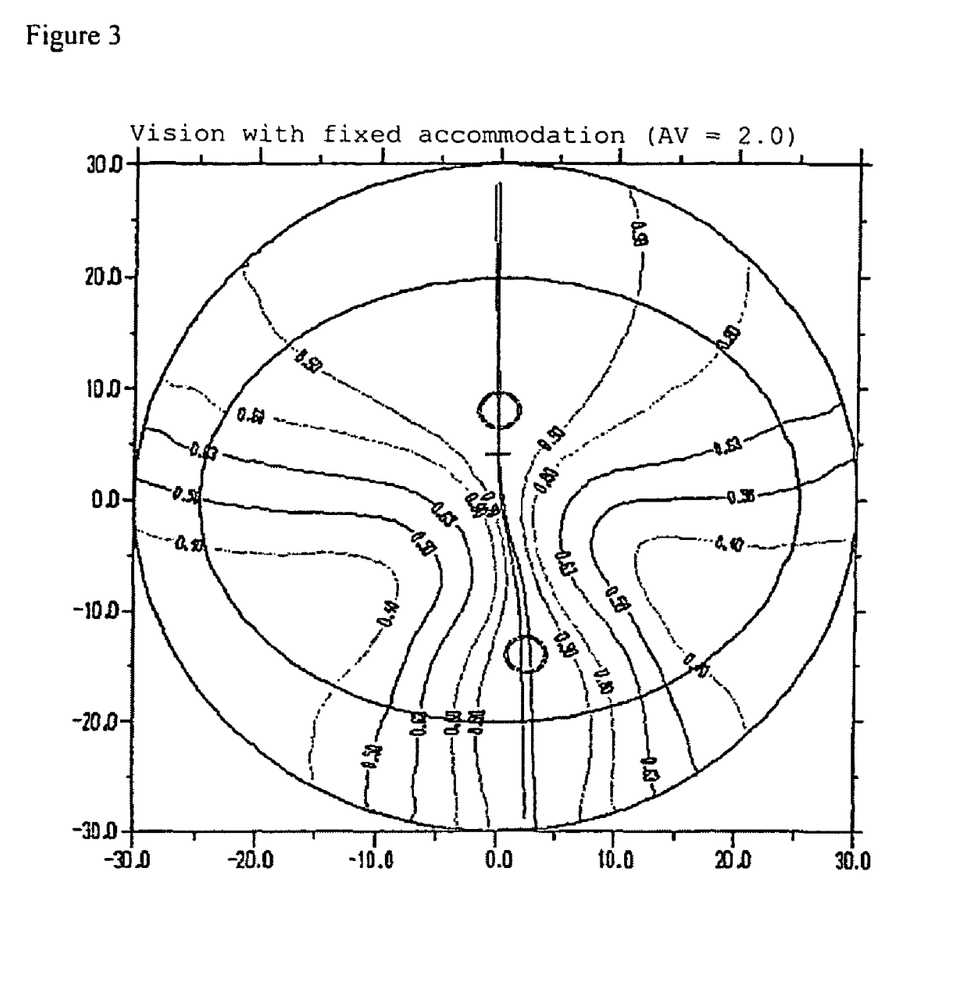
FIG. 3 is a diagram showing the distribution of the decline in visual acuity on the basis of the imaging errors with a progressive lens after optimization.

FIG. 3 shows the following individual parameters: sphere=!3.5 dpt; addition=2.0 dpt; prescribed cylinder=1 dpt; axial position=20 deg; effect in the reference points in the use position; prism vertically=−0.5 cm/m; prism horizontally=1.0 cm/m; interpupillary distance=72 mm; corneal vertex distance=19 mm; ocular pivot point distance=32.5 mm; anterior tilt=11 degrees; frame lens angle (lateral tilt)=1 degree; center thickness=2 mm; diameter=70 mm; thickness reduction prism=1.0 cm/m; material=Perfalit 1.6 n=1.597; far object distance=0 dpt; near object distance=−1000/380 mm; basic curve sph=3.7 dpt.

FIG. 3 clearly shows that the isolines again run symmetrically with the principal line, the transitions are again softer and the vision areas are definitely enlarged. The shift in the principal line of sight in comparison with the old principal line and/or principal line of sight can also be seen along with the fact that the isolines now run symmetrically with the new principal line of sight.

Figure 4:
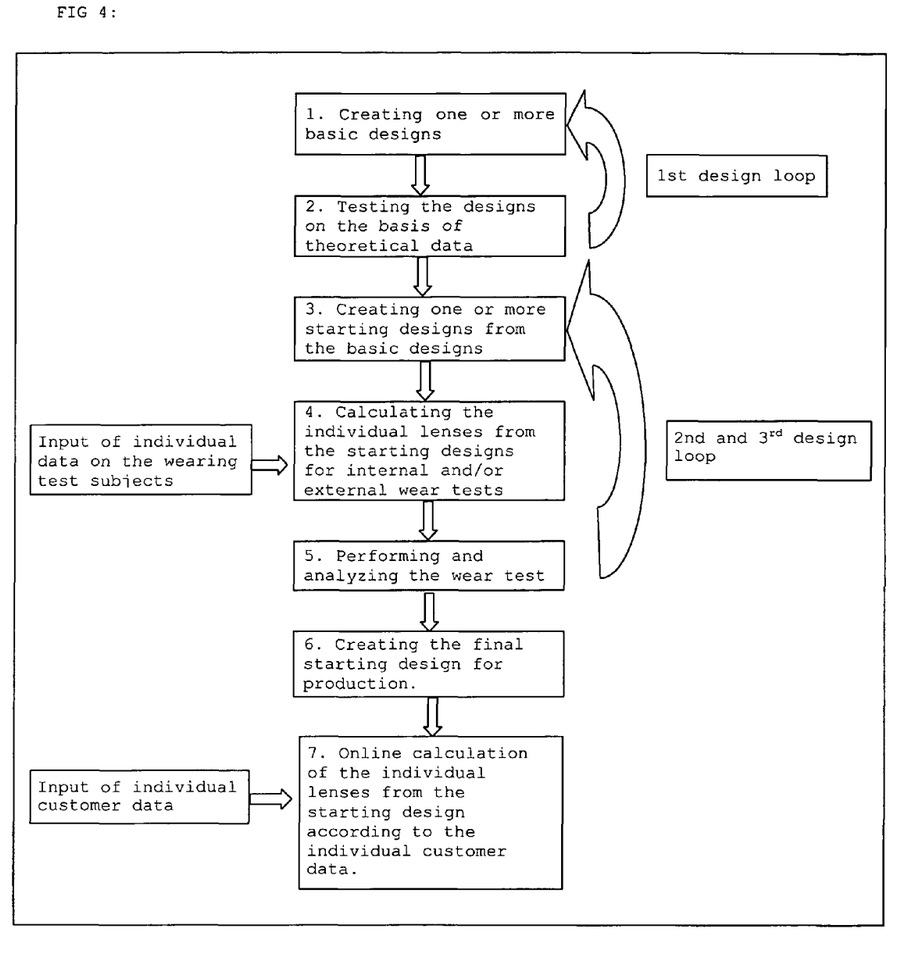
FIG. 4 is a flow chart showing the steps of the inventive method.

Referring to the method shown in FIG. 4, first a basic design and/or a number of basic designs are created. These are analyzed on the basis of the theoretical data. The basic designs are then modified and adjusted until they correspond to the specifications (e.g., from basic research or wearing tests). This basic design is calculated for a weak effect and default values or standard values which are described in greater detail below. In principle, such a basic design can be created by a method like that described in aforementioned WO 01/81979.

In the next step so-called starting designs are created from the basic designs. Starting designs are a limited number of progressive lenses which have been calculated for default values for the individual parameters and cover the range of effect. If only a few lenses are made available for the starting design, the complexity is much lower. However, this makes it more difficult to comply with the various requirements of hyperopias, myopias, etc., and the complexity in optimization of the individual progressive lenses becomes even greater. For this reason, if various basic designs (usually three to four) are to be tested in comparison with one another in wearing tests, the starting design will have only a few options but more options will usually be included in the final starting design for production.

In the extreme case this may be a single basic design. However, at least one series will usually be provided for myopia, one series for emmetropia and one series for hyperopia.

From these starting designs, the progressive lenses corresponding to the individual data on the test wearing subjects are calculated. The calculation method is described in greater detail below.

As an alternative, all lenses for wearing experiments may also be calculated by the method described in aforementioned WO 01/81979.

In a second design loop, the design can be modified and adjusted on the basis of the wearing tests. In a first phase, the various starting designs are tested in an internal wearing test with a smaller number of volunteers. In a second phase, external wearing tests are conducted with a relatively large number of volunteers. This yields three design loops in principle.

When the final design has been found, the starting design for production must be created. This is normally selected to have more options than the starting design for the wearing test.

Then the calculation of the individual lenses is performed according to individual customer data using with the starting design.

The calculation program obtains the new individual parameters using an input mask (in the case of wearing tests) or via an interface in online optimization in the production process. All these parameters have already been identified. The most proximate starting lens with all parameters and setpoint specifications is selected from the starting design on the basis of the prescribed spherical effect and addition. The lens to be optimized is equated with the selected starting lens and then the individual parameters of the starting lens are replaced by the new parameters, in particular by the prescribed spherical, cylindrical and prismatic values, the addition and the thickness reduction prism.

Then the object distance and accommodation model is calculated anew.

Next the lens is arranged in space and/or with respect to the eye according to the new individual parameters (interpupillary distance, corneal vertex distance, ocular pivot point distance, anterior tilt and lateral tilt).

In the next step the material (refractive index), the diameter and/or the frame shape and the basic curve are replaced.

Then an atoric surface is imposed on the progressive surface. The atoric surface is calculated so that at the far reference point the spherical and cylindrical effect including the axial position, preferably in the use position, corresponds to the prescription; the vertical and horizontal prism, preferably in the use position, corresponds to the combination of the prescribed prism and the thickness reduction prism at the prism reference point and the center thickness and/or edge thickness corresponds to the specified value. This is best achieved with an iteration method (e.g., Newtonian iteration with six variables). The six degrees of freedom here are the two principal curvatures and the axial position of the atoric surface, the surface normals (x and y components) at the vertex of the total progressive surface and the distance from the front surface to the back surface.

This yields a progressive lens, the quality of which corresponds to that of a conventional progressive lens except that the progressive and astigmatic effects are on one side.

In the next step, the calculated atoric surface is converted into a B spline, a so-called superimposed spline or optimization spline. It is also possible to calculate a new B spline from the atoric superimposed surface and the progressive surface beneath that. However, it is better to use a superimposed spline.

Then the number of coefficients to be optimized can be selected independently of the basic surface (progressive surface) underneath without losing information and the surface to be optimized must carry less information. However, this is important only for optimization of coefficients. The arrow height of the back surface always corresponds to the sum of the basic surface and the superimposed spline. In the optimization, the complete back surface is always taken into account in the beam calculation as well as in the wave front calculation.

In the next step, the principal line of vision is calculated anew because it deviates from the old principal line and/or principal line of sight because of the altered positioning of the lens in relation to the eye and the altered prismatic effect in the view-through sites.

Then the setpoint specifications are shifted by the amount by which the new principal line of vision has been shifted in comparison with the old principal line of vision in each horizontal step, i.e., each setpoint specification receives a new respective u coordinate. For example if the x offset of the principal line of vision at the height of the near reference point were to be 3 mm instead of 2 mm, then the u coordinates would be shifted by 1 mm in this horizontal section. It is preferable for the setpoint specifications not to be taken from a starting lens but instead to be interpolated according to the effect from the adjacent lenses of the starting design.

In the next step the progressive surface is optimized either with a commercial optimization program (e.g., from the NAG library) or with an optimization program tailored specifically to the problem and the surface representation used. The latter is preferred here. In most cases the goal is reached after only three optimization steps. However, it is better to perform ten optimization steps for the sake of safety. Such an optimization takes less than 30 seconds based on the ideal starting point and the ideal setpoint specifications and the ideally tailored optimizer on a normal PC (e.g., Intel Pentium 4 processor with 1800 MHz).

It has been found advantageous to optimize not the entire surface of the lens but instead only a central area (approx. 20-30 mm) and then expand this area using a specially developed extrapolation program. This saves on computation time without any influence on quality.

The invention claimed is:

1. A method for calculating an individual progressive lens for a customer, comprising:
creating a basic design for lenses based on theoretical specifications, wherein the basic design is calculated for a given lens power and for default values for individual parameters;
creating one or more starting designs for wearing tests from the basic design;
calculating individual progressive lenses for wearing tests from the starting designs based on individual data of test persons other than the customer, said test persons being selected to wear eye-glasses with said individual progressive lenses,
performing and analyzing the wearing tests from the starting design,
modifying and adjusting the starting designs on the basis of the wearing tests of said individual progressive lenses by said test persons;
creating final starting designs for production from the modified and adjusted starting designs; and
calculating individual progressive lens for the customer from the final starting designs according to individual data,
wherein said starting designs for wearing tests and the starting designs for production being a limited number of progressive lenses, which are calculated for default values of the individual parameters and which cover a predetermined range of powers of the lens,
wherein the starting designs for wearing tests comprising at least one series of progressive lenses for myopia, one series of progressive lenses for emmetropia and one series of progressive lenses for hyperopia, one series of progressive lenses comprising at least two progressive lenses with differing addition, and
wherein the number of the starting designs for the production is greater than the number of the starting design for the wearing tests.

2. A method as claimed in claim 1, wherein the individual progressive lenses are calculated from the starting designs or the final starting designs according to individual data by selecting a starting surface from the starting design;

selecting a starting progressive lens from the starting designs or the final starting designs on the basis of the individual customer data, and equating the starting progressive lens with a progressive lens to be optimized;

replacing the default values by the individual data;

calculating an object distance and accommodation model;

arranging the progressive lens to be optimized lens with respect to the eye according to the individual data;

taking into account new lens parameters;

calculating a toric or an atoric superimposed surface to be superimposed on the progressive surface of the progressive lens to be optimized, wherein the tonic or atoric superimposed surface is calculated so that at the reference point the dioptrical power of the lens corresponds to the prescription and the thickness of the lens is correctly adjusted;

converting the tonic or the atoric superimposed surface into an optimization spline;

calculating a new principal line of vision;

interpolation and transformation of setpoint specifications;

optimizing the progressive lens thereby obtaining the individual progressive lens; and expanding the progressive area.

3. A method as claimed in claim 2, wherein the superimposed surface is an atoric superimposed surface.

* * * * *